United States Patent [19]

Rylatt

[11] Patent Number: 4,659,541
[45] Date of Patent: Apr. 21, 1987

[54] NUCLEAR FUEL ROD SUPPORT GRID WITH IMPROVED MULTIPLE DIMPLE ARRANGEMENT

[75] Inventor: John A. Rylatt, Monroeville Boro, Pa.

[73] Assignee: Westinghouse Electric Corp., Pittsburgh, Pa.

[21] Appl. No.: 729,387

[22] Filed: May 1, 1985

[51] Int. Cl.⁴ ............................................... G21C 3/34
[52] U.S. Cl. .................................................... 376/442
[58] Field of Search ...................... 376/442, 462, 441

[56] References Cited

U.S. PATENT DOCUMENTS

| Re. 28,079 | 7/1974 | Andrews et al. | 376/442 |
|---|---|---|---|
| 3,379,617 | 4/1968 | Andrews et al. | 376/442 |
| 3,679,547 | 7/1972 | Warberg | 376/442 |
| 3,932,216 | 1/1976 | Jabsen | 376/442 |
| 3,933,584 | 1/1976 | Litt | 176/78 |
| 4,090,918 | 5/1978 | Masetti | 376/442 |
| 4,111,348 | 9/1978 | Laird et al. | 228/181 |
| 4,124,444 | 11/1978 | Jabsen | 376/442 |
| 4,125,435 | 11/1978 | Jabsen | 376/442 |
| 4,137,125 | 1/1979 | Walters | 376/442 |
| 4,221,636 | 9/1980 | Feutrel | 376/441 |
| 4,325,786 | 4/1982 | Wohlsen | 376/442 |
| 4,364,902 | 12/1982 | Feutrel | 376/442 |
| 4,411,862 | 10/1983 | Leclereq et al. | 376/442 |
| 4,474,730 | 10/1984 | Hellman et al. | 376/442 |

FOREIGN PATENT DOCUMENTS

| 0025393 | 3/1981 | European Pat. Off. . | |
| 0080835 | 6/1983 | European Pat. Off. . | |
| 2027968 | 12/1971 | Fed. Rep. of Germany | 376/442 |
| 2200587 | 4/1974 | France . | |
| 2303352 | 10/1976 | France . | |
| 0142485 | 11/1979 | Japan | 376/442 |
| 0625250 | 11/1961 | Netherlands | 376/442 |

Primary Examiner—Deborah L. Kyle
Assistant Examiner—Dan Wasil

[57] ABSTRACT

A fuel rod support grid includes interleaved straps arranged to form a matrix of hollow cells. Each cell receives one fuel rod and is defined by pairs of opposing elongated walls which are shared with adjacent cells. Each wall of the pairs thereof forming a single cell has one side which is a part of the perimeter of the single cell and has an opposite side which is part of the perimeter of one of several cells disposed about and adjacent to the single cell. The improvements incorporated by the support grid comprise a first set of dimples formed at an upper end of each wall of the pairs thereof defining each cell of the grid and a second set of dimples formed at a lower end of each grid cell wall. Each of the first and second sets of dimples are composed of a pair of upper and lower dimples which project outwardly from the same one side of the wall in which the dimples of the set are formed and a center dimple which is located between and adjacent to the upper and lower dimples and projects outwardly from the opposite side of the wall. The dimples in the first and second sets thereof are adapted to resiliently and frictionally engage fuel rods when received through the respective cells. The first sets of dimples on the walls of the pairs thereof defining each cell are formed at generally the same elevation. And, likewise, the second sets of dimples on the walls of the pairs thereof defining each cell are formed at generally the same elevation.

6 Claims, 13 Drawing Figures

NUCLEAR FUEL ROD SUPPORT GRID WITH IMPROVED MULTIPLE DIMPLE ARRANGEMENT

CROSS REFERENCE TO RELATED APPLICATIONS

Reference is hereby made to the following copending applications dealing with related subject matter and assigned to the assignee of the present invention:

1. "Nuclear Fuel Spacer Grid With Improved Grid Straps" by Edmund E. DeMario, assigned U.S. Ser. No. 473,516 and filed 3/9/83, now U.S. Pat. No. 4,585,615.
2. "Nuclear Fuel Spacer Grid With Improved Outer Straps" by Edmund E. DeMario et al, assigned U.S. Ser. No. 473,515 and field 3/9/83, now U.S. Pat. No. 4,585,616.
3. "A Partial Grid For A Nuclear Reactor Fuel Assembly" by Edmund E. DeMario, assigned U.S. Ser. No. 564,049 and filed Dec. 21, 1983.
4. "A Coolant Flow Mixer Grid For A Nuclear Reactor Fuel Assembly" by Edmund E. DeMario et al, assigned U.S. Ser. No. 567,450 and filed Dec. 30, 1983.
5. "A Low Pressure Drop Grid For A Nuclear Reactor Fuel Assembly" by Edmund E. DeMario et al, assigned U.S. Ser. No. 567,448 and filed Dec. 30, 1983, now abandoned.

BACKGROUND OF THE INVENTION

1. Field of the Invention

The present invention relates generally to fuel assemblies for nuclear reactors and, more particularly, is concerned with a grid having an improved arrangement of multiple dimples for supporting nuclear fuel rods.

2. Description of the Prior Art

In most nuclear recactors, the reactor core is comprosed of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Conventional designs of grids include a multiplicity of interleaved straps having an egg-crate configuration designed to form cells which individually accept the fuel rods and control rod guide thimbles. The cells of each grid which accept and support the fuel rods at a given axial location therealong typically use relatively resilient springs and/or relatively rigid protrusions (called dimples) formed into the metal of the interleaved straps. The springs and dimples of each grid cell frictionally engage or contact the respective fuel rod extending through the cell. Additionally, outer straps are attached together and peripherally enclose the grid straps to impart strength and rigidity to the grid.

Representative of the prior art are the grids described and illustrated in U.S. Patents to Andrews et al (No. Re. 28,079), Warberg (No. 3,679,547), Masetti (No. 4,090,918), Laird et al (No. 4,111,348), Jabsen (Nos. 4,124,444 and 4,125,435), Walters (No. 4,137,125), Wohlsen (No. 4,325,786), Feutrel (No. 4,364,902), Leclercq et al (No. 4,411,862), and Hellman et al (No. 4,474,730).

For grids fabricated of zircaloy type materials, grid springs are not able to maintain their design preload after installation of the fuel assembly into the nuclear reactor core due to irradiation and temperature effects. In some circumstances it is difficult to achieve the spring rates and spring forces considered necessary to control bowing of fuel rods.

Consequently, a need exists for an improved dimple arrangement in fuel assembly grids which will provide the force necessary to support the fuel rods in the reactor core with minimal degradation over time.

SUMMARY OF THE INVENTION

The present invention provides a fuel assembly grid construction designed to satisfy the aforementioned needs. As with conventional grid designs, the grid of the present invention is formed by a multiplicity of interleaved straps having an egg-crate configuration designed to form cells which individually accept the fuel rods. However, at each intersection of the straps in the improved grid, the straps are joined by formation of a weld bead. Also, a multiple dimple set is formed in the upper and lower ends of each wall of the individual cells. The locations of the plurality of dimple sets minimize potential moments in the grid cell walls. Each dimple set is preferably composed of two outer (i.e. upper and lower) dimples which project into one cell and a center dimple which projects oppositely into a neighboring cell. Many different arrangements of the dimples in the respective sets thereof within given cells are possible within the parameters of the present invention. This type of construction forms a semi-rigid cell in which lateral displacement and rotation of a fuel rod is restrained.

Accordingly, the present invention is directed to an improved fuel rod support grid having a plurality of interleaved straps arranged so as to form a matrix of hollow cells. Each cell receives one fuel rod and is defined by pairs of opposing elongated walls which are shared with adjacent cells. Each wall of the pairs thereof, which define a single cell, has one side which forms a part of the perimeter of the single cell and also has an opposite side which forms part of the perimeter of one of several cells disposed about and adjacent to the single cell. The improvements incorporated by the support grid comprise: (a) a first set of dimples formed at an upper end of each wall of the pairs thereof defining each cell of the grid; and (b) a second set of dimples formed at a lower end of each wall of the pairs thereof defining each cell of the grid. Each of the first and second sets of dimples is composed of a pair of upper and lower dimples which project outwardly from the same one side of the wall in which the dimples of the set are formed and a center dimple being located between and adjacent to the upper and lower dimples and which projects outwardly from the opposite side of the wall. The dimples in the first and second sets thereof are adapted to frictionally engage fuel rods when received through adjacent ones of the repsective cells.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
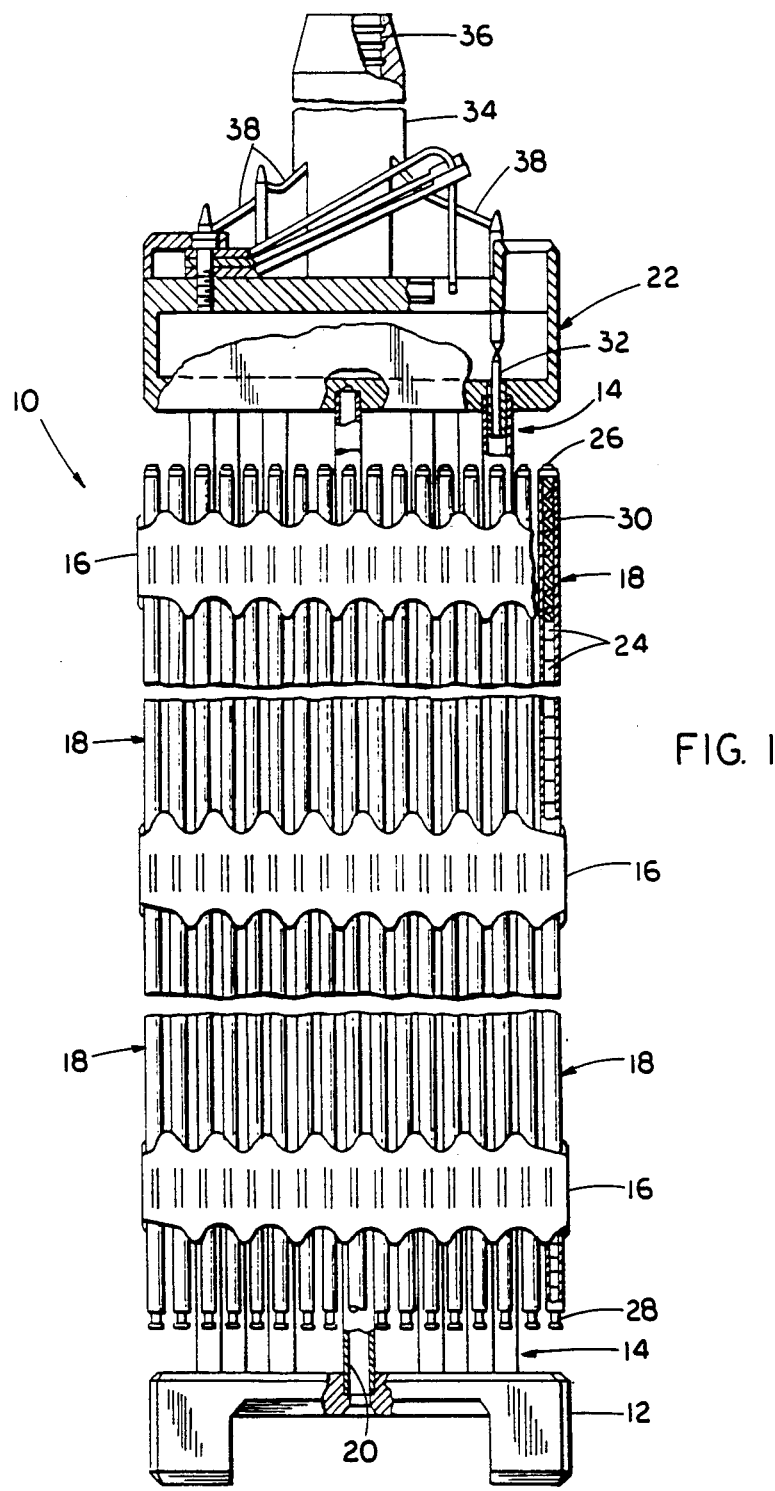
FIG. 1 is an elevational view, partly in section, of a nuclear fuel assembly with fuel rod support grids which employ the improved construction of the present invention.
Figure 2:
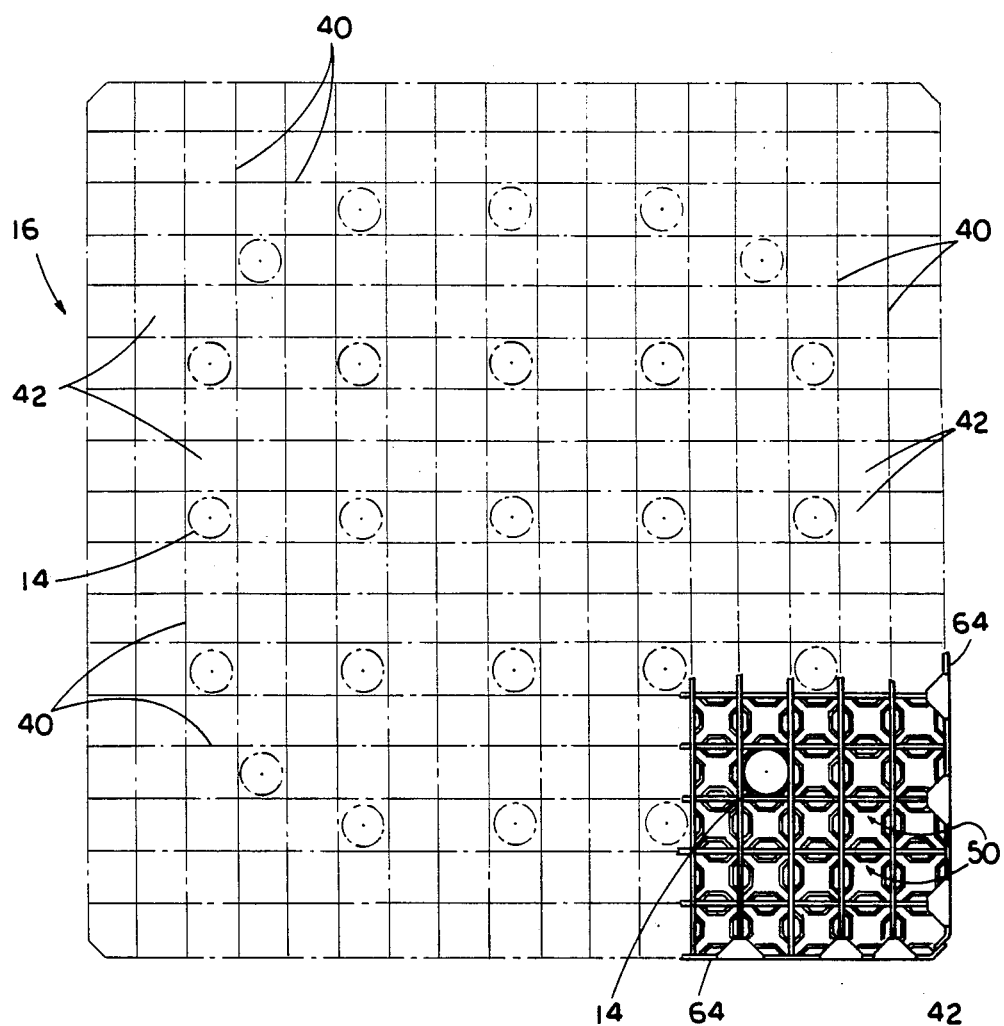
FIG. 2 is a top plan view, as seen along line 2—2 of FIG. 1, of a fuel rod support grid having the improved construction of the present invention.
Figure 3:
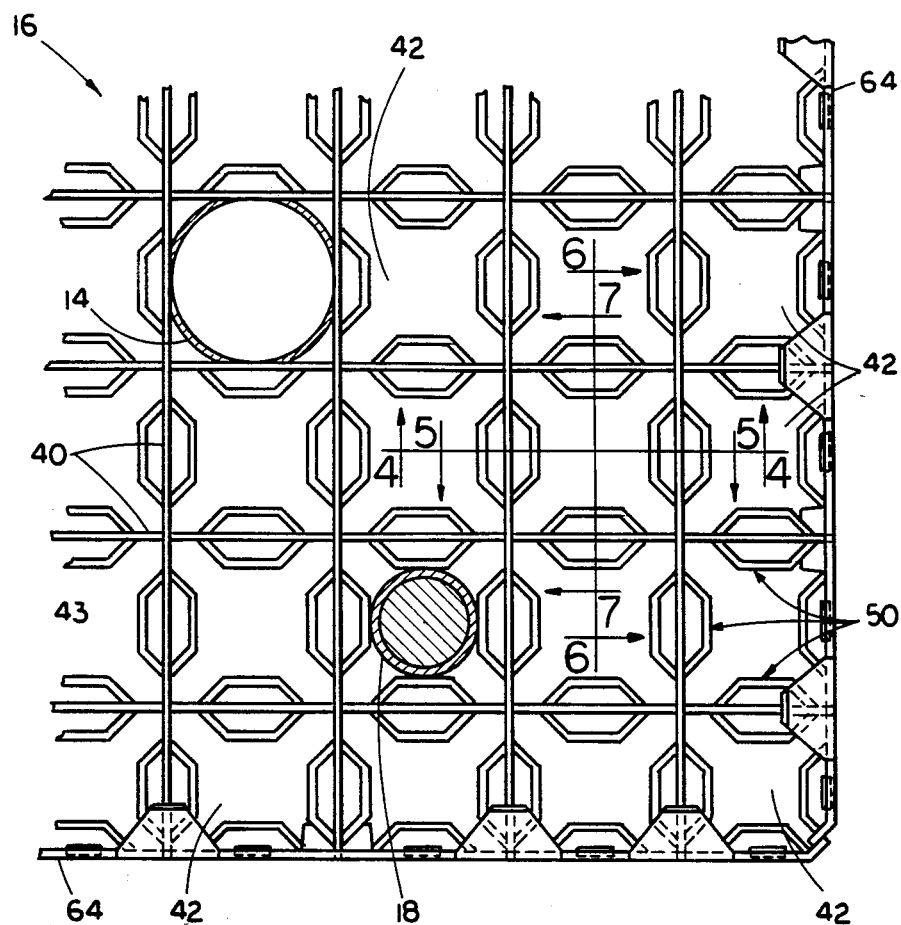
FIG. 3 is an enlarged fragmentary top plan view of the lower right corner of the grid of FIG. 2.
Figure 4:
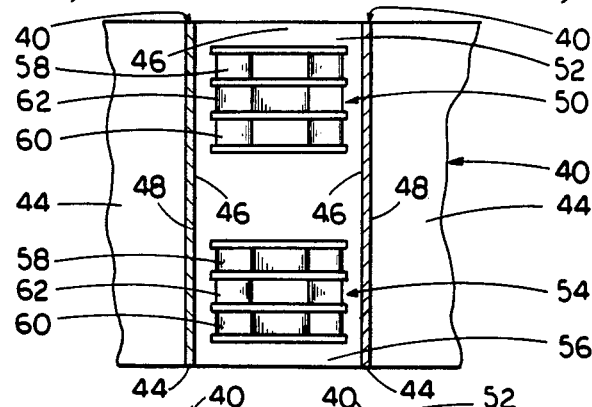
FIGS. 4, 5, 6 and 7 are sectional views, as taken along respective lines 4—4, 5—5, 6—6 and 7—7 of FIG. 3, showing the arrangements of the dimple sets and of the multiple dimples of each set in the walls of a given cell of the grid.
Figure 5:
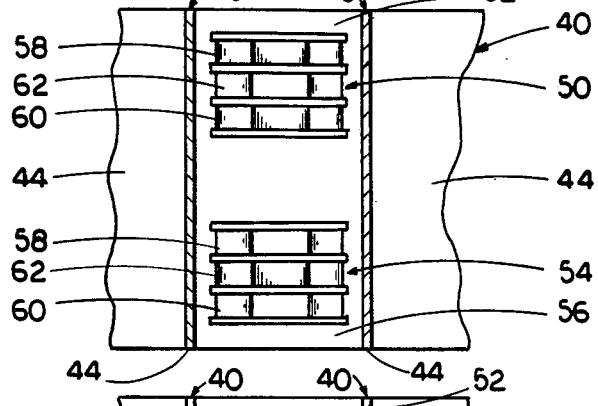
Figure 6:
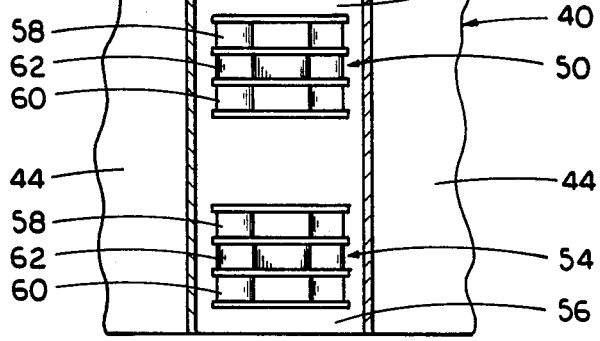
Figure 7:
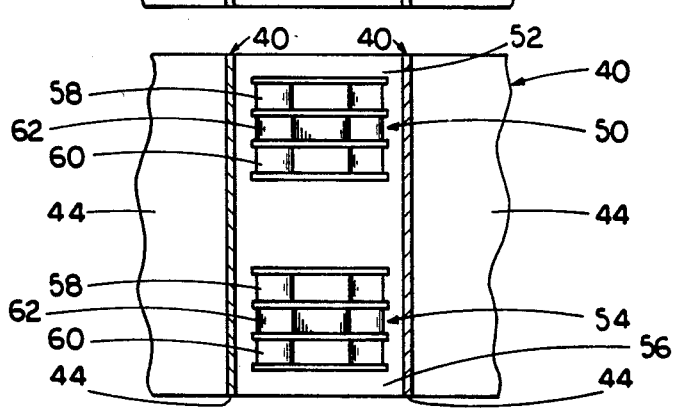

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 which have the improved construction of the present invention, as will be described in detail later. The improved grids 16 are axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the improved grids 16 of the present invention, being spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellet 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of usefuel work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Improved Fuel Rod Support Grid Construction

For precisely maintaining the spacing between the fuel rods 18 in the reactor core, preventing both lateral and longitudinal movement thereof and minimizing the potential of the rods to bow over their useful life, the improved grids 16 are designed in accordance with the principles of the present invention to impose forces about the circumference of the individual fuel rods which project radially inwardly toward the longitudinal axis of the rod. Referring now to FIGS. 2 to 7, it is seen that each of the improved grids 16 includes a multiplicity of interleaved inner straps 40 having an egg-crate configuration designed to form a matrix of hollow cells, indicated at 42, a majority of which individually accept one fuel rod 18 and a minority of which accept one control rod guide thimble 14. At each intersection of the inner grid straps 40, the straps are joined by formation of a weld bead 43. Each cell 42 for receiving one fuel rod 18 is defined by two pairs of opposing elongated walls 44 which are shared with adjacent ones of the cells. Each wall 44 of the pairs thereof which define a single cell 42, has one side 46 which forms a part of the perimeter of the single cell 42 and also has an opposite side 48 which forms part of the perimeter of one of several cells 42 disposed about and adjacent to the single cell.

The improvements of the present invention incorporated by each support grid 16, as seen in detail in FIGS. 3 to 7, basically include a first set of dimples, generally designated 50, formed at an upper end 52 of each wall 44 of the pairs thereof defining each cell 42 of the grid 16. Each support grid 16 also includes a second set of dimples, generally designated 54, formed at a lower end 56 of each wall 44 of the pairs thereof defining each grid cell 42.

More particularly, each of the first and second sets of dimples 50,54 is composed of a pair of upper and lower dimples 58,60 which project outwardly from the same one side 46 of the cell wall 44 and a center dimple 62 which is located between and adjacent to the upper and lower dimples 58,60 and projects outwardly in an opposite direction from the opposite side 48 of the wall 44.

The first sets 50 of dimples on the walls 44 of the pairs thereof defining each cell 42 are formed at generally the same elevation. And, likewise, the second sets 54 of dimples on the walls 44 defining each grid cell 42 are formed at generally the same elevation.

The dimples 58,60,62 in the first and second sets 50,54 thereof are adapted to resiliently and frictionally engage fuel rods 18 when received through the respective cells 42. Specifically, the dimples 58,60,62 are fabricated from a metal material, such as zircaloy, of the inner straps 40 in any suitable manner, such as by a conventionally die punching and deforming technique. They have a generally U-shaped configuration and, because they project outwardly from the cell wall 44 in an alternating, staggered fashion, they provide relatively rigid protrusions which are capable of attaining high spring rates and of providing a controlled force on the fuel rods even though the straps 40 from which they are formed are relatively flexible in nature. Additional rigidity and strength is imparted to the gird 16 by a series of outer straps 64 which are attached together and peripherally enclose and are connected with the inner straps 40.

Figure 8:
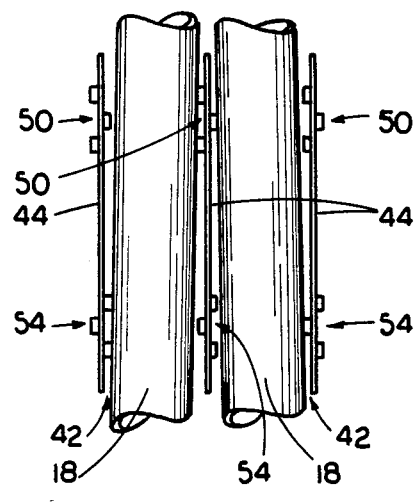
FIG. 8 is a schematic representation of two fuel rods in two adjacent cells of the improved support grid of the present invention in which there is demonstrated the restraint provided by the arrangement of dimple sets in the support grid.

FIG. 8 shows two fuel rods 18 disposed through two adjacent cells 42 in the improved support grid 16. It represents how the arrangement of dimple sets 50,54 on the walls 44 defining the cells 42 provide the forces which serve to resist the attempt of the two fuel rods to bow toward each other above the top of the grid 16. First, lateral rotation of the individual fuel rods 18 is restrained by the grid dimple forces at each of the dimple sets providing restraining moments. Second, the particular dimple set under direct compression, such as dimple set 50 on the wall 44 between the fuel rods 18 in FIG. 8, is very stiff because of the close proximity of the load paths across the cell wall. This stiffness limits the lateral motion of the fuel rods toward one another. Finally, a third but small contribution to the restraining moment is provided at each dimple set elevation by the interaction of opposite sets of dimples on the opposing walls acting on the fuel rods.

Figures 9A, 9B, 9C, 9D, 9E:
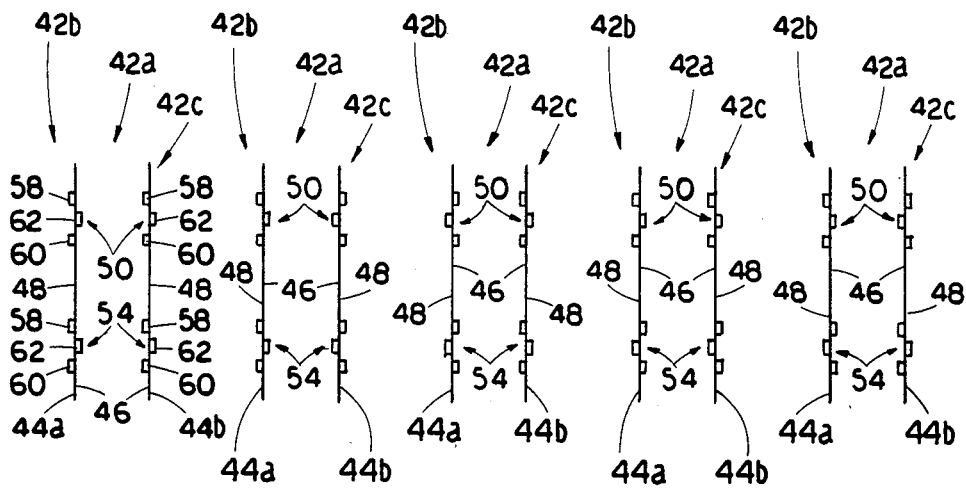
FIGS. 9a through 9e are schematic representations of different possible arrangements of the dimples in the sets thereof on two of the opposite walls of a cell in the improved support grid.

FIGS. 9a through 9e schematically illustrate five different possible arrangements of the dimples 58,60,62 in the sets 50,54 thereof on two of the four opposite walls 44 defining a single cell 42a in the improved support grid 16. The other two of the four opposite walls 44 can contain any of these arrangments also. In FIG. 9a, the upper and lower dimples 58,60 in each of the first and second sets 50,54 thereof on one wall 44a and the center dimple 62 in each of the first and second sets 50,54 thereof on the other wall 44b, of one pair of the walls 44 defining the single cell 42a project outwardly from the opposite sides 48 of the respective one and other walls 44a,44b into the adjacent cells 42b,42c. On the other hand, the upper and lower dimples 58,60 in each of the first and second sets 50,54 thereof on the other wall 44b, and the center dimple 62 in each of the first and second sets 50,54 thereof on the one wall 44a, of the one pair of the walls 44 defining the single cell 42a project inwardly from the one sides 46 of the respective other and one walls 44b,44a into the single cell 42a.

In FIG. 9b, the upper and lower dimples 58,60 in each of the first and second sets 50,54 thereof on both walls 44a,44b of one pair of the walls 44 defining the single cell 42a project outwardly from the opposite sides 48 of the respective walls 44a,44b into the adjacent cells 42b,42c. On the other hand, the center dimple 62 in each of the first and second sets 50,54 thereof on both walls 44a,44b of one pair of the walls 44 defining the single cell 42a project inwardly from the one sides 46 of the respective walls 44a,44b into the single cell 42a.

In FIG. 9c, the upper and lower dimples 58,60 in each of the first and second sets 50,54 thereof on both walls 44a,44b of one pair of the walls 44 defining the single cell 42a project inwardly from the one sides of the respective walls 44a,44b into the single cell 42a. On the other hand, the center dimple 62 in each of the first and second sets 50,54 thereof on both walls 44a,44b of one pair of the walls 44 defining the single cell 42a project outwardly from the opposite sides 48 of the respective walls 44 into the adjacent cells 42b,42c.

In FIG. 9d, the upper and lower dimples 58,60 in the first set 50 thereof and the center dimple 62 in the second set 54 thereof on one wall 44a, and the center dimple 62 in the first set 50 thereof and the upper and lower dimples 58,60 in the second set 54 thereof on the other wall 44b, of one pair of the walls 44 defining the single cell 42a project outwardly from the opposite sides 48 of the respective one and other walls 44a,44b into the adjacent cells 42b,42c. On the other hand, the center dimple 62 in the first set 50 thereof and the upper and lower dimples 58,60 in the second set 54 thereof on the one wall 44a, and the upper and lower dimples 58,60 in the first set 50 thereof and the center dimple 62 in the second set 54 thereof on the other wall 44b, of one pair of the walls 44 defining the single cell 42a project inwardly from the one sides 46 of the respective one and other walls 44a,44b into the single cell 42a.

In FIG. 9e, the upper and lower dimples 58,60 in the first set 50 thereof and the center dimple 62 in the second set 54 thereof on one wall 44a, and the upper and lower dimples 58,60 in the first set 50 thereof and the center dimple 62 in the second set 54 thereof on the other wall 44b, of one pair of the walls 44 defining the single cell 42a project outwardly from the opposite sides 48 of the respective one and other walls 44a,44b into the adjacent cells 42b,44c. On the other hand, the center dimple 62 in the first set 50 thereof and the upper and lower dimples 58,60 in the second set 54 thereof on the one wall 44a, and the center dimple 62 in the first set 50 thereof and the upper and lower dimples 58,60 in the second set 54 thereof on the other wall 44b, of one pair of the walls 44 defining the single cell 42a project inwardly from the one sides 46 of the respective one and other walls 44a,44b into the single cell 42a.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely exemplary embodiments thereof.

I claim:

1. In an improved fuel rod support grid including a plurality of interleaved straps arranged so as to form a matrix of hollow cells, each cell for receiving one fuel rod and being defined by pairs of opposing elongated walls which are shared with adjacent cells, each wall of said pairs thereof, which define a single cell, having one side forming a part of the perimeter of said single cell and having an opposite side forming part of the perimeter of one of several cells disposed about and adjacent to said single cell, the improvement which comprises:

(a) a first set of dimples formed at an upper end of each wall of said pairs thereof defnining each cell of said grid; and
(b) a second set of dimples formed at a lower end of each wall of said pairs thereof defining each cell of said grid;
(c) each of said first and second sets of dimples being composed of a pair of upper and lower dimples which project outwardly from the same one side of the wall in which said dimples of said set are formed and a center dimple being located between and adjacent to said upper and lower dimples and which projects outwardly from the opposite side of the wall in which said dimples of said set are formed;
(d) said dimples in said first and second sets thereof being adapted to resiliently and frictionally engage fuel rods when received through adjacent ones of said respective cells.

2. The improved support grid as recited in claim 1, wherein said first sets of dimples on said walls of said pairs thereof defining each cell are formed at generally the same elevation.

3. The improved support grid as recited in claim 1, wherein said second sets of dimples on said walls of said pairs thereof defining each cell are formed at generally the same elevation.

4. The improved support grid as recited in claim 1, wherein said upper and lower dimples in each of said first and second sets thereof on one wall, and said center dimple in each of said first and second sets thereof on the other wall, of one pair of said walls defining said single cell project outwardly from said opposite sides of said respective one and other walls into said adjacent cells, whereas said upper and lower dimples in each of said first and second sets thereof on said other wall, and said center dimple in each of said first and second sets thereof on said one wall, of said one pair of said walls defining said single cell project inwardly from said one sides of said respective other and one walls into said single cell.

5. The improved support grid as recited in claim 1, wherein said upper and lower dimples in each of said first and second sets thereof on said walls of one of said pairs of opposing walls defining said single cell project outwardly from said opposite sides of said respective walls into said adjacent cells, whereas said center dimple in each of said first and second sets thereof on said walls of said one of said pairs of opposing walls defining said single cell project inwardly from said one sides of said respective walls into said single cell.

6. The improved support grid as recited in claim 1, wherein said upper and lower dimples in each of said first and second sets thereof on said walls of one of said pairs of opposing walls defining said single cell project inwardly from said one sides of said respective walls into said single cell, whereas said center dimple in each of said first and second sets thereof on said walls of said one of said pairs of opposing walls defining said single cell project outwardly from said opposite sides of said respective walls into said adjacent cells.

* * * * *